UNITED STATES PATENT OFFICE.

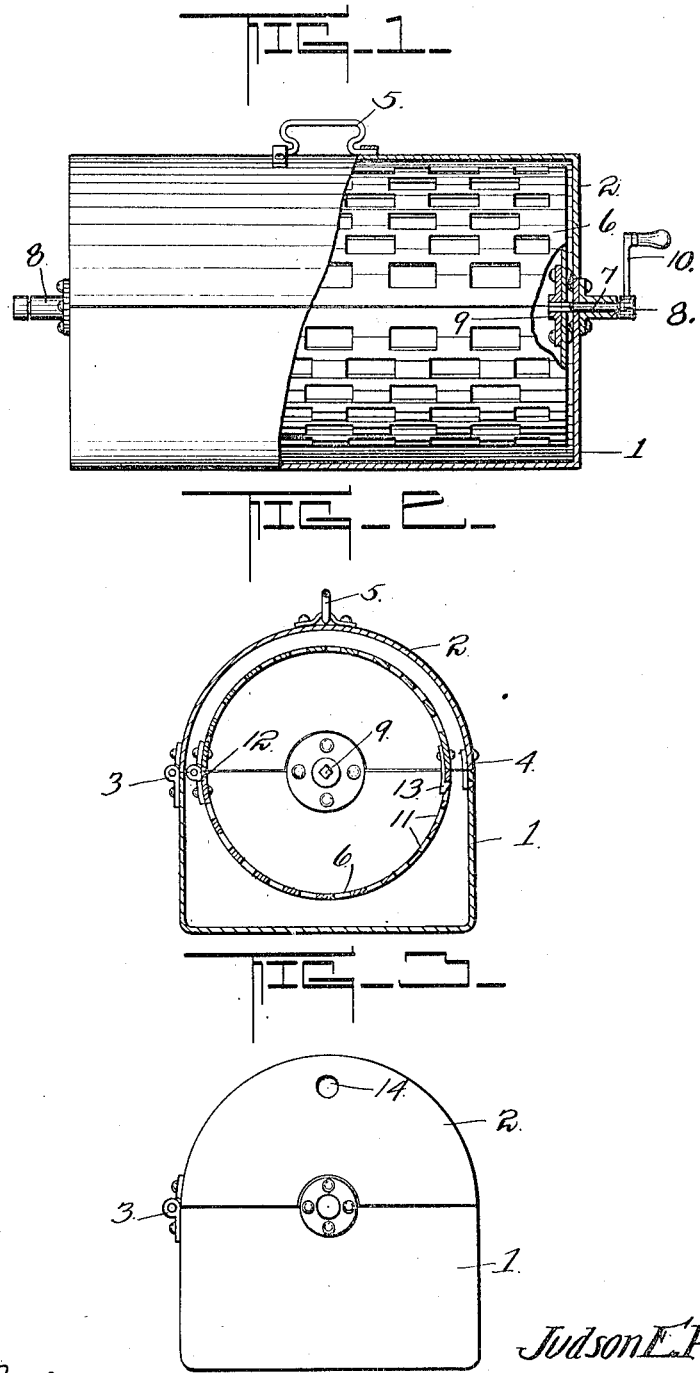

JUDSON E. PARKER, OF GARDINER, MAINE.

SELF-BASTING PAN.

1,292,031.  Specification of Letters Patent.  Patented Jan. 21, 1919.

Application filed April 19, 1917. Serial No. 163,272.

*To all whom it may concern:*

Be it known that I, JUDSON E. PARKER, a citizen of the United States, residing at Gardiner, in the county of Kennebec and State of Maine, have invented certain new and useful Improvements in Self-Basting Pans, of which the following is a specification.

This invention relates to new and useful improvements in pans and the principal object of the invention is to provide a device of this character which will be self-basting and in which the fowl or other article being cooked may be turned over without removing the cover.

Another object of the invention is to provide means for holding the article being cooked above the bottom of the pan.

Another object of the invention is to provide simple and efficient means whereby the fowl may be turned over in the pan without uncovering the pan and by means of a detachable handle so there is no need of touching the hot pan.
Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:

Figure 1 is a front view, with parts in section.
Fig. 2 is a cross sectional view.

Fig. 3 is an end view.

In these figures, 1 indicates the pan provided with a cover 2, preferably of semicircular form, as shown. This cover is hinged to the pan, as at 3, and is provided with a latch 4 for securing the same in closed position so that the same may be carried about by the handle 5 on the cover.

Within this pan is located the cylinder 6, which is to contain the article to be cooked and this cylinder is rotatably mounted in the pan by means of pins 7 mounted in the journals 8 in the ends of the pan and these pins engage square holes 9 in the ends of the cylinder. 10 is a crank adapted to engage with one of the pins 7 to rotate the cylinder within the pan. The cylinder is perforated as shown at 11 and is formed of two parts hinged together at 12 and a latch 13 secures the two parts together.

The article to be cooked is placed in the cylinder 6, after which the cylinder is closed and the cover 2 secured on the pan by the latch 4, it being understood that enough water is placed in the pan 1 to provide steam for cooking the article. Whenever desired, the article may be turned over by simply placing the crank 10 on the pin 7 to partly rotate the cylinder. The crank is only placed in engagement with the pin when the cylinder is to be rotated so that said crank will always be cool and there is no danger of burning the hand by having to touch the hot pan.

It will be noted that the sector shaped end walls of the cylinder are solid, although the cylinder is provided with rectangular perforations, as hereinbefore explained. These perforations are arranged in longitudinal rows, it being noted that the perforations of one row are in staggered relation with the perforations of the rows upon either side thereof. It will therefore be noted that the perforations of alternate rows will be in circumferential alinement. Therefore, the gravy within the pan 1, will be considerably agitated when passed into the interior of the rotating cylinder, as it cannot directly pass into the cylinder through the perforations of one row and out through the perforations of another row without passing toward either end of the cylinder. Therefore, the gravy will thoroughly baste the meat within the cylinder. It will also be noted by referring to Fig. 2 that the latch 13 is fixed upon the inner surface of one of the sections and that the edge of the remaining section of the cylinder to have its head engaging within one of the perforations, thus holding the sectional cylinder in a closed position, although the latch will be in an out of the way place and when the meat falls onto the latch due to the rotation of the cylinder, it will tend to more firmly hold the latch against accidental displacement.

When desired, I may form small openings, such as 14 in the ends of the cover of the pan, It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:—

In a device of the class described, the combination of a receiving pan, a cylinder rotatably mounted within said pan, means for rotating said cylinder, said cylinder comprising a pair of hingedly connected sections, said sections including solid end walls, and perforated supporting walls, the perforations of the supporting walls being rectangular and formed in rows extending longitudinally of the cylinder, the perforations of one row being staggered with respect to the perforations of the adjacent rows thereto, whereby the perforations of alternate rows will be in circumferential alinement, thus causing liquid passing into the cylinder to be agitated therein before escaping therefrom as the cylinder rotates and a latch fixed upon the inner portion of one of the sections of the cylinder and overlapping the remaining section and an edge thereof to fit within one of the perforations, whereby the latch will be in an out-of-the-way position to firmly hold the sections against accidentally opening, while the contents of the cylinder falling onto the latch will hold the same in a firmer latched condition.

In testimony whereof I affix my signature in presence of two witnesses.

JUDSON E. PARKER.

Witnesses:
PAULINE LOWELL,
GRACE A. CLARK.